(12) United States Patent
Enatsu et al.

(10) Patent No.: US 8,461,471 B2
(45) Date of Patent: Jun. 11, 2013

(54) TANDEM GAS METAL ARC WELDING

(75) Inventors: Yuichiro Enatsu, Tagajyo (JP); Makoto Takahashi, Kai (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 895 days.

(21) Appl. No.: 12/375,753

(22) PCT Filed: Aug. 1, 2007

(86) PCT No.: PCT/JP2007/065079
§ 371 (c)(1),
(2), (4) Date: Jan. 30, 2009

(87) PCT Pub. No.: WO2008/016084
PCT Pub. Date: Feb. 7, 2008

(65) Prior Publication Data
US 2009/0236320 A1    Sep. 24, 2009

(30) Foreign Application Priority Data
Aug. 2, 2006 (JP) .................. P2006-211093

(51) Int. Cl.
*B23K 9/00* (2006.01)
*B23K 35/38* (2006.01)

(52) U.S. Cl.
USPC ............................................. 219/74

(58) Field of Classification Search
USPC ............... 219/72, 74, 121.55, 137.2, 137.31, 219/130.01, 136, 137 R, 139, 121.51, 124.1–125.12
See application file for complete search history.

(56) References Cited

U.S. PATENT DOCUMENTS

| | | | |
|---|---|---|---|
| 3,575,568 A * | 4/1971 | Tateno | 219/75 |
| 4,034,179 A | 7/1977 | Koshiga et al. | |
| 4,220,844 A * | 9/1980 | Essers | 219/121.36 |
| 4,645,903 A * | 2/1987 | De Vito et al. | 219/137 R |
| 6,172,333 B1 * | 1/2001 | Stava | 219/137 PS |
| 6,303,891 B1 * | 10/2001 | Gault | 219/74 |

(Continued)

FOREIGN PATENT DOCUMENTS

| | | |
|---|---|---|
| JP | 51-69436 | 1/1976 |
| JP | 58-103966 | 6/1983 |

(Continued)

OTHER PUBLICATIONS

International Search Report for PCT/JP2007/065079 mailed Nov. 6, 2007.

(Continued)

*Primary Examiner* — Tu B Hoang
*Assistant Examiner* — Thomas Ward
(74) *Attorney, Agent, or Firm* — Nixon & Vanderhye P.C.

(57) ABSTRACT

The present invention provides a method for tandem gas metal arc welding using a leading electrode and a trailing electrode, wherein a shielding gas for the leading electrode is a two-component mixed gas containing argon and carbon dioxide, or a three-component mixed gas containing argon, carbon dioxide, and oxygen; a shielding gas for the trailing electrode is argon, a two-component mixed gas containing argon and carbon dioxide, a two-component mixed gas containing argon and oxygen, or a three-component mixed gas containing argon, carbon dioxide, and oxygen; and the concentration of carbon dioxide in the shielding gas for the trailing electrode is lower than the concentration of carbon dioxide in the shielding gas for the leading electrode.

8 Claims, 4 Drawing Sheets

U.S. PATENT DOCUMENTS

2005/0173379 A1*  8/2005  Ireland et al. .................. 219/75
2005/0199593 A1*  9/2005  Ignatchenko et al. ... 219/121.45
2006/0163220 A1*  7/2006  Brandt et al. ............ 219/121.55

FOREIGN PATENT DOCUMENTS

| | | |
|---|---|---|
| JP | 59-110474 | 6/1984 |
| JP | 2003-53545 | 2/2003 |
| JP | 2005-230825 | 9/2005 |

OTHER PUBLICATIONS

Chinese Office Action dated Apr. 1, 2013 issued in Chinese Patent Application No. 200780028119.8 and English Translation, 13 pp.

* cited by examiner

TANDEM GAS METAL ARC WELDING

This application is the U.S. national phase of International Application No. PCT/JP2007/065079 filed 1 Aug. 2007 which designated the U.S. and claims priority to Japanese Patent Application No. 2006-211093 filed 2 Aug. 2006, the entire contents of each of which are hereby incorporated by reference.

TECHNICAL FIELD

The present invention relates to a method for tandem gas metal arc welding (GMA welding) in which a deposition rate per one weld pass can be increased by moving two electrodes at the same time, and a welding torch and a welding apparatus used in this welding method.

BACKGROUND ART

Decreasing cost is required in many fields such as a field in which Wick plates used in construction equipment and bridges, etc. are welded, and a field in which thin plates used in an automobile are welded. Therefore, a tandem GMA welding method which can weld with a high efficiency has been used.

The tandem GMA welding is a method in which two welding wires used as electrodes are used, and two arcs are generated at the same time to weld. The main advantages of the tandem GMA welding are that the welding speed can be increased and the deposition rate per one weld pass can be increased.

However, since an attractive force between the two arcs is generated, a shape of a droplet is not fixed and here is a tendency for the separation properties of the droplet to be inferior. Therefore, a larger amount of the spatter is generated compared with a conventional GMA welding method using one welding wire. A great deal of time is necessary to remove the spatter attached on weld beads, and there is a problem of an increase of welding cost.

Japanese Unexamined Patent Application, First Publication No. 2003-53545 discloses a tandem GMA welding method using a solid wire for welding which is not copper-plated.

According to the Patent Document, it is reported that when a welding using a solid wire for welding, which is not copper-plated, and an inert gas-enriched shielding gas is used under fixed conditions, the amount of the spatter generated is little, stability of a molten pool is improved, and a weld bead having an excellent shape is obtained.

In addition, a mixed gas (the mixing ratio of argon is in a range of from 55 to 96%) of argon and carbon dioxide, and a mixed gas (the mixing ratio of argon is in a range of from 55 to 96%) obtained by adding oxygen or carbon dioxide into a mixed gas of argon and helium are disclosed.
[Patent Document No. 1] Japanese Unexamined Patent Application, First Publication No. 2003-53545

DISCLOSURE OF THE INVENTION

Problems to be Solved by the Invention

In the tandem GMA welding, a leading electrode has a function for making the weld penetration deep, and a trailing electrode has a function for controlling the molten metal, which is made by the arc generated by the leading electrode and flows backward relative to the molten pool, to adjust the molten pool shape. Therefore, it is believed that both the leading electrode and the trailing electrode have a preferable shielding gas composition.

In consideration of the above-described problems, an object of the present invention is to provide a method for tandem GMA welding which can stably transfer the droplet, and decrease the amount of the spatter without a decrease of weld penetration depth by supplying shielding gases having a different composition which are suitable for the leading electrode and the trailing electrode; a welding torch used in the method; and a welding apparatus used in this method.

Means for Solving the Problem

In order to solve the problems, the present invention provides a method for tandem GMA welding using a leading electrode and a trailing electrode, wherein a shielding gas for the leading electrode is a two-component mixed gas containing argon and carbon dioxide, or a three-component mixed gas containing argon, carbon dioxide, and oxygen; a shielding gas for the trailing electrode is argon, a two-component mixed gas containing argon and carbon dioxide, a two-component mixed gas containing argon and oxygen, or a three-component mixed gas containing argon, carbon dioxide, and oxygen; and the concentration of carbon dioxide in the shielding gas for the trailing electrode is lower than the concentration of carbon dioxide in the shielding gas for the leading electrode.

In the method for tandem GMA welding, it is preferable that the concentration of carbon dioxide in the shielding gas for the leading electrode is 5% by volume or more and less than 40% by volume, and the concentration of oxygen in the shielding gas for the leading electrode is 0% by volume or more and 10% by volume or less.

Oxygen provides a lesser effect for making weld penetration deep than that of carbon dioxide. However, adding a small amount of oxygen does not exert much of a harmful influence on the quality of welding and the amount of the spatter generated. Therefore, oxygen may be added in the shielding gas for the leading electrode and the trailing electrode. However, when the amount of oxygen added is large, after solidification of the molten metal, oxide is adhered to the surface of the beads as slag, while the amount of the spatter generated is increased.

Therefore, the concentration of oxygen in the shielding gas for the leading electrode is preferably 0% by volume or more and 10% by volume or less, and more preferably 5% by volume or less.

The smaller the oxygen concentration in the shielding gas for the leading electrode is, the lesser the amount of slag generated on the surface of the beads. Thereby, the amount of oxygen contained in the weld metal is decreased, and toughness is increased. Therefore, it is preferable that the concentration of oxygen in the shielding gas for the leading electrode be as small as possible.

When the concentration of carbon dioxide in the shielding gas for the leading electrode is 40% by volume or more, the reaction force exerted on the droplet at the edge of the welding wire is excessive to the gravitational force applied to the droplet, and the droplet hardly drops from the edge of the welding wire. Thereby, the droplet enlarges at the edge of the welding wire, and contacts with the molten pool. As a result, the amount of the spatter is increased. It is believed that this is caused because the concentration of carbon dioxide in the shielding gas for the leading electrode is large, and the droplet cannot be spray-transferred by adjusting voltage and current, and a part of the droplet transfer is short circuiting transfer.

In this method for tandem GMA welding, it is preferable at the difference between the concentration of carbon dioxide in the shielding gas for the leading electrode and the concentration of carbon dioxide in the shielding gas for the trailing electrode is 3% by volume or more, and the concentration of oxygen in the shielding gas for the trailing electrode is 0% by volume or more and 10% by volume or less, and more preferably 0% by volume or more and 5% by volume or less.

Similar to the effects obtained by the shielding gas for the leading electrode, when the concentration of oxygen in the shielding gas for the trailing electrode is smaller, the amount of slag generated on the surface of the bead is decreased. In addition, the amount of oxygen contained in the weld metal is decreased, and toughness is improved. Therefore, the concentration of oxygen in the shielding gas for the trailing electrode is preferably smaller.

In this method for tandem GMA welding, it is preferable that gases are switched such that the shielding gas for the leading electrode is supplied to an electrode to be the leading electrode, and the shielding gas for the trailing electrode is supplied to an electrode to be the trailing electrode in accordance with the reverse of welding direction.

In order to achieve the object, the present invention provides a torch for tandem GMA welding, wherein the torch is used in the method for tandem GMA welding, and the torch has plural electrodes inside a nozzle, and a partition for preventing to mix a shielding gas for a leading electrode and a shielding gas for a trailing electrode.

In addition, the present invention provides a torch for tandem GMA welding, wherein the torch is used in the method for tandem GMA welding, and the torch has a protection cover for shielding a molten pool which is fixed backward in a welding direction.

In the torch for tandem GMA welding, it is preferable that the protection cover have a shielding gas nozzle.

Furthermore, in order to achieve the object, the present invention provides an apparatus for tandem GMA welding having a welding torch including a leading electrode and a trailing electrode, and a shielding gas supplying source for supplying a shielding gas to each electrode, wherein the apparatus has a device for switching between a shielding gas supplied to the leading electrode and a shielding gas supplied to the trailing electrode.

Effects of the Present Invention

According to the method for tandem GMA welding of the present invention, it is possible to decrease the amount of the spatter generated dung welding without a decrease of the weld penetration depth by using shielding gases which are suitable for the leading electrode and the trailing electrode. Thereby, it is possible to decrease the load for removing the spatter, and decrease the cost of welding.

In particular, when shielding gases having a different composition are supplied to the leading electrode and the trailing electrode respectively; the concentration of carbon dioxide in the shielding gas for the trailing electrode is lower than the concentration of carbon dioxide in the shielding gas for the leading electrode; the shielding gas for the leading electrode is a two-component mixed gas containing argon and carbon dioxide, or a three-component mixed gas containing argon, carbon dioxide, and oxygen; and the shielding gas for the trailing electrode is argon, a two-component mixed gas containing argon and carbon dioxide, a two-component mixed gas containing argon and oxygen, or a three-component mixed gas containing argon, carbon dioxide, and oxygen, a droplet can be transferred stably, and it is possible to decrease the amount of the spatter without a decrease of weld penetration depth.

Since carbon dioxide has a relatively high electric potential gradient, the arc generated is covered, and gathered at the end of the welding wire. Thereby, the molten pool is made deeper by an arc pressure, and weld penetration also becomes deeper. Penetration in tandem GMA welding is largely influenced by the leading arc which directly heats a surface of a base material firstly during welding. Due to his, it is believed that the penetration is determined by the concentration of carbon dioxide in the shielding gas for the leading electrode.

In other words, it is believed that when the concentration of the carbon dioxide in the shielding gas for the leading electrode is identical, the penetration is almost not affected by the concentration of carbon dioxide in the shielding gas for the trailing electrode. In addition, when the concentration of argon in the shielding gas for the trailing electrode is increased by decreasing the concentration of carbon dioxide in the shielding gas for the trailing electrode, separation properties of the droplet are increased. Thereby, the amount of the spatter generated by the trailing electrode is decreased, and the amount of the spatter generated is totally decreased.

The welding torch according to the present invention has plural electrodes inside a nozzle, and a partition is formed between the leading electrode and the trailing electrode in the nozzle. Thereby, it is possible to supply the shielding gases having a different composition into the leading electrode and the trailing electrode respectively without mixing the shielding gasses in the nozzle. As a result, it is possible to exert the effects of the shielding gasses at a maximum.

In addition, when the protection cover is arranged on the welding torch, the shielding gas nozzle is attached to the protection cover, and the shielding gas is supplied from the shielding gas nozzle, it is possible to block the molten pool from the atmosphere. As a result, it is possible to decrease welding defects such as oxidation, nitridation, and blowholes.

Furthermore, the welding direction for the torch is arbitrarily changed, and the leading electrode and the trailing electrode are replaced with each other in practical welding. The welding apparatus according to the present invention has a gas switching device for supplying the shielding gas for the leading electrode to an electrode to be the leading electrode, and the shielding gas for the trailing electrode to an electrode to be the trailing electrode, depending on the change of the welding direction. Thereby, it is possible to obtain the equivalent freedom obtained by using the shielding gases having an identical composition for the leading and trailing electrodes without subjecting to restriction by the welding direction.

EXPLANATION OF REFERENCE SYMBOLS

Figure 1:
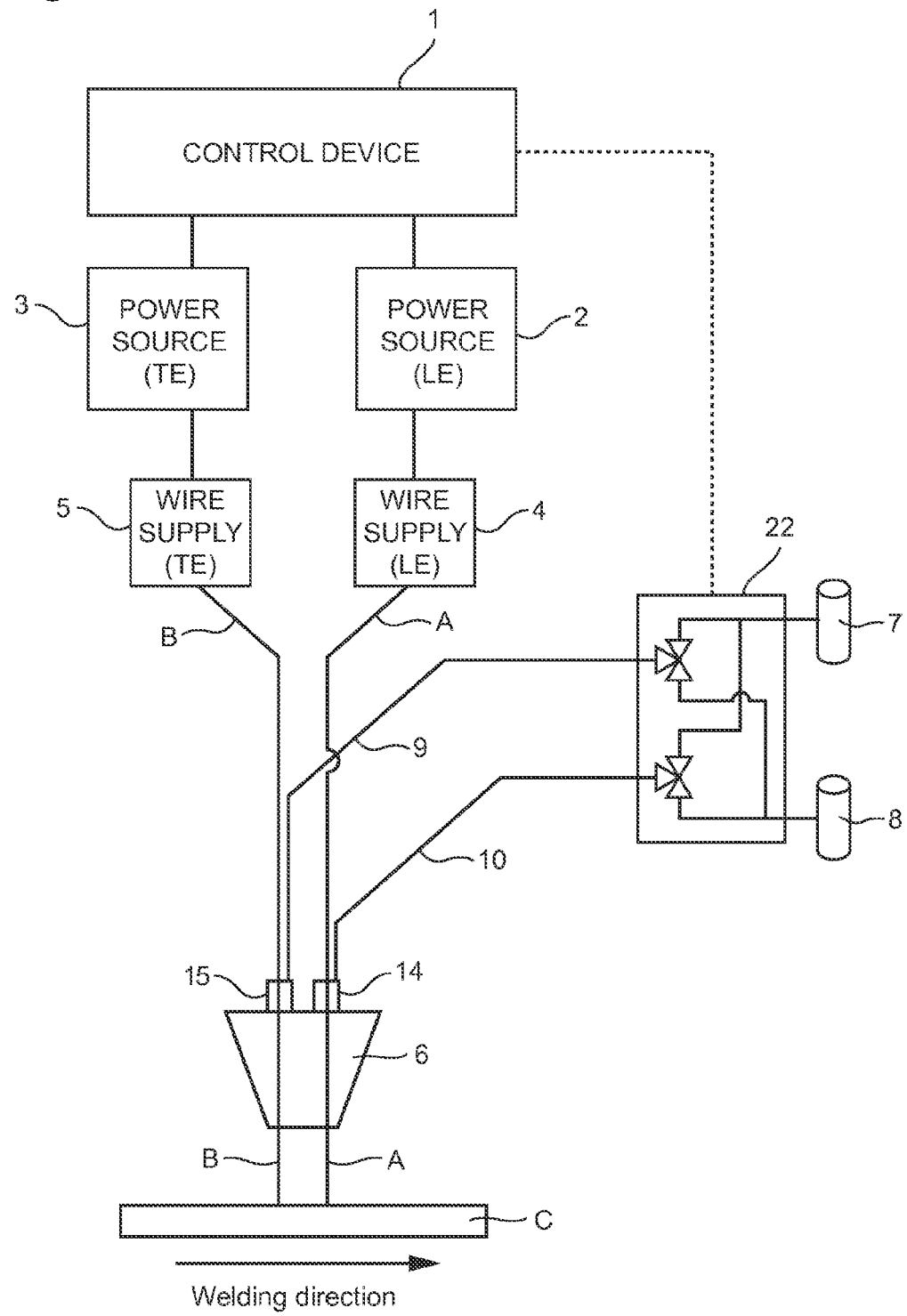
FIG. 1 is a schematic view showing one example of the welding apparatus used in the welding method according to the present invention.

1: control device
2: leading electrode welding power source
3: trailing electrode welding power source
4: wire supplying device for leading electrode
5: wire supplying device for trailing electrode
6: welding torch
7: shielding gas supplying source for the leading electrode
8: shielding gas supplying source for the trailing electrode
9, 10: pipe
11: nozzle
12: leading contact tip
13: trailing contact tip
14: leading electrode entrance
15: trailing electrode entrance
16: leading flow channel
17: tailing flow channel
19: partition
20: protection cover
21: shielding gas nozzle
22: gas switching device
A, B: welding wire used as an electrode
C: work

BEST MODE FOR CARRYING OUT THE INVENTION

Figure 2:
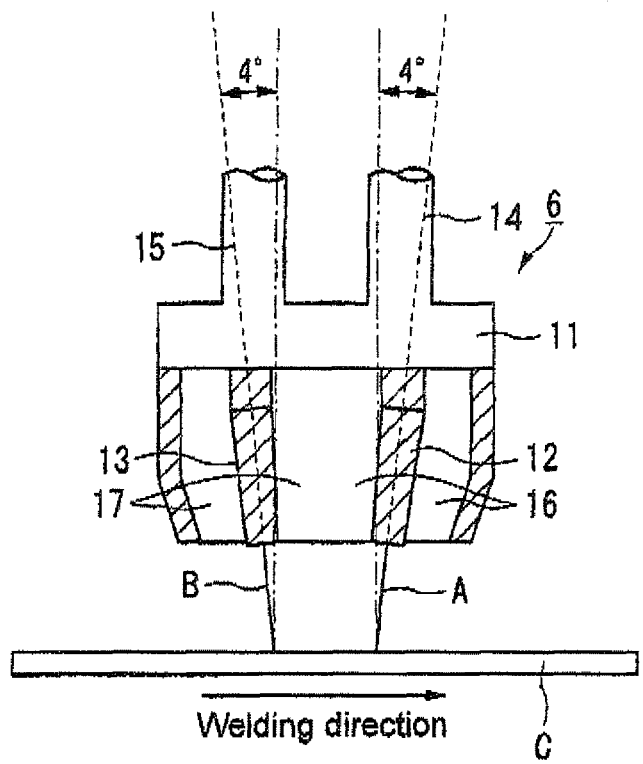
FIG. 2 is a schematic view showing a first example of the welding torch used in the welding apparatus shown in FIG. 1.

FIG. 1 is a schematic view showing one example of the welding apparatus used in the tandem GMA welding method according to the present invention. FIG. 2 shows a first example of the welding torch used in the welding apparatus shown in FIG. 1. In FIG. 1, the reference numeral 1 denotes a control device. The control device 1 sends signals for controlling a welding current value, a welding voltage value, a welding wire feed speed to a leading electrode welding power source 2, a trailing electrode welding power source 3, a wire supplying device 4 for the leading electrode, and a wire supplying device 5 for the trailing electrode. Thereby, the control device 1 controls individually the operation of these devices. In addition, the control device 1 sends signals for switching gases to the gas switching device 22 depending on changing the welding direction.

The leading electrode welding power source 2 and the trailing electrode welding power source 3 send individually a fixed welding current to the wire supplying device 4 for the leading electrode, and the wire supplying device 5 for the trailing electrode. Then, the welding current is respectively applied to welding wires A and B which are delivered from the wire supplying device 4 for the leading electrode, and the wire supplying device 5 for the trailing electrode to the leading and trailing contact tips.

Examples of the welding wire A and B include general solid wires for mild steel GMA welding (YGW11 to YGW19) which are specified in JIS A 3312.

Each of the shielding gas for the leading electrode and the shielding gas for hie trailing electrode is supplied respectively at a fixed flow rate to the welding torch 6 from the shielding gas supplying source for the leading electrode 7 and the shielding gas supplying source for the trailing electrode 8, via the gas switching device 22, and pipes 9 and 10.

When the gas switching device 22 receives the signal from the control device 1, the gas switching device 22 supplies the shielding gases to the pipes 9 and 10 depending on the welding direction such that the shielding gas for the leading electrode is supplied to the leading electrode and the shielding gas for the trailing electrode is supplied to the trailing electrode.

FIG. 2 shows the first embodiment of the welding torch 6. The welding torch 6 has a nozzle 11 in a cover shape for spraying two kinds of the shielding gas toward the work C; a leading contact tip 12 and a trailing contact tip 13 which are arranged back and forth in a welding direction with a fixed interval inside the nozzle 11; a leading electrode entrance 14 for supplying the shielding gas for the leading electrode and the leading welding wire used as an electrode A into the nozzle 11; and a trailing electrode entrance 15 for supplying the shielding gas for the trailing electrode and the trailing welding wire used as an electrode B into the nozzle 11.

Inside the nozzle 11, there is a leading flow channel 16 for the shielding gas for the leading electrode which is formed at the forward position relative, to the leading electrode 12 in a welding direction. In addition, there is also a trailing flow channel 17 for the shielding gas for the trailing electrode which is formed at the backward position relative to the trailing electrode 13 in a welding direction, inside the nozzle 11. The shielding gas for the leading electrode, which is introduced from the leading electrode entrance 14, flows through the leading flow channel 16. The shielding gas for the trailing electrode, which is introduced from the trailing electrode entrance 15, flows trough the trailing flow channel 17. After that, the shielding gasses are respectively blown out toward the work C.

In addition, the leading weld wire used as an electrode A, which is introduced from the leading electrode entrance 14, is delivered by passing through a channel formed in the leading contact tip 12. The trailing weld wire used as an electrode B, which is introduced from the trailing electrode entrance 15, is also delivered by passing through a channel formed in the trailing contact tip 13.

The angle of each electrode can be selected freely. In FIG. 2, the leading electrode 2 is slightly inclined forward in the welding direction, and the trailing electrode 3 is slightly inclined backward in the welding direction. Thereby, the welding wires A and B, which are delivered from the contact lips 12 and 13, are also slightly inclined. Specifically, the weld wires A and B are inclined respectively at 4 degrees relative to the vertical direction of the work C.

The shielding gas for the leading electrode is flowed from the leading flow channel 16 in the nozzle 11 toward the work C. The shielding gas for the trailing electrode is also flowed from the trailing flow channel 17 toward the work C. The welding wires A and B are delivered from the contact tip 12 and 13 respectively. Then, the welding current is applied to the contact tips 12 and 13, and arcs are generated, Wile maintaining the conditions, the welding torch 6 moves in the welding direction shown in FIG. 2 relatively to the work C.

Thereby, the are generated by the leading contact tip 12 is surrounded by the shielding gas for the leading electrode, and the arc generated by the trailing contact tip 13 is also surrounded by the shielding gas for the trailing electrode, Due to this, each arc is blocked from the atmosphere.

In the welding method of the present invention, the composition of the shielding gas for the leading electrode is different from the composition of the shielding gas for the trailing electrode.

As the shielding gas for the leading electrode, a two-component mixed gas containing argon and carbon dioxide, or a three-component mixed gas containing argon, carbon dioxides and oxygen is used.

The concentration of carbon dioxide in the shielding gas for the leading electrode is preferably 5% by volume or more and less than 40% by volume, and more preferably 10% by volume or more and 30% by volume or less. When the concentration of carbon dioxide in the shielding gas for the leading electrode is less than 5% by volume, the arc is unstable, and the weld penetration is insufficient. In contrast, when it is 40% by volume or more, effects for decreasing the amount of the spatter cannot be obtained, In particular, when it is 30% by volume or less, the arc is stable and excellent effects for decreasing the amount of the spatter can be obtained.

In addition, the concentration of oxygen in the shielding gas for the leading electrode is preferably 0% by volume or more and 10% by volume or less, and more preferably 5% by volume or less. When the concentration of oxygen exceeds 10% by volume, the spatter and slag are increased and mechanical properties of the obtained jointed material are deteriorated.

In contrast, as the shielding gas for a trailing electrode, argon, a two-component mixed gas containing argon and carbon dioxide, a two-component mixed gas containing argon and oxygen, or a three-component mixed gas containing argon, carbon dioxide, and oxygen is used.

The concentration of carbon dioxide in the shielding gas for the trailing electrode is preferably 0% by volume or more and less than 37% by volume.

In addition, the concentration of oxygen in the shielding gas for the trailing electrode is preferably 0% by volume or more and less than 10% by volume, and more preferably 5% by volume or less.

The composition of t shielding gases is adjusted such that the concentration of carbon dioxide in the shielding gas for the trailing electrode is lower than that of carbon dioxide in the shielding gas for the leading electrodes The difference in concentration of carbon dioxide between them is preferably 3% by volume, and more preferably 5% by volume. When it is less than 3% by volume, the obtained effects for decreasing the amount of the spatter are insufficient. In contrast when it is 5% by volume or more, sufficient effects for decreasing sputter can be obtained.

As explained above, it is possible to transfer stably droplets without a decrease of weld penetration, and a decrease of the amount of the spatter generated in welding by making the composition of the shielding gases for the leading and trailing electrodes different, specifically, making the concentration of carbon dioxide in the shielding gas for the trailing electrode lower t that of carbon dioxide in the shielding gas for the leading electrode.

Moreover, the method for tandem GMA welding according to the present invention can be used in a tandem GMA welding torch having nozzles each which is provided with each electrode, other than the torch having the structure shown in FIG. 2.

Figure 3:
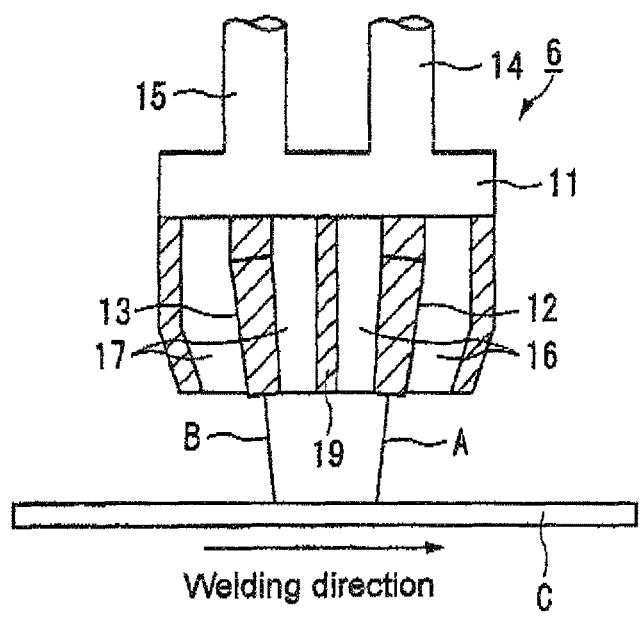
FIG. 3 is a schematic view showing a second example of the welding torch.

FIG. 3 shows the second welding torch used in the welding method according to the present invention. Moreover, the components shown in FIG. 3 which are the sane as the components shown in FIG. 2 have the same reference numerals as shown in FIG. 2. Thereby, an explanation of those sane components is omitted in this embodiment.

The welding torch 6 shown in FIG. 3 has a partition 19 for separating the leading contact tip 12 and the trailing contact tip 13 at roughly the center of the nozzle 11, and between the contact tips 12 and 13. This is the difference between the torch shown in FIG. 2 and FIG. 3. Examples of the material for the partition 19 include fire-resistant resin and heat-resistant res.

When the partition 19 is formed in the torch 6, the shielding gas for the leading electrode and the shielding gas for the trailing electrode are not mixed in the nozzle 11. Thereby, it is possible to exert the effects of the shielding gasses at a maximum.

Figure 4:
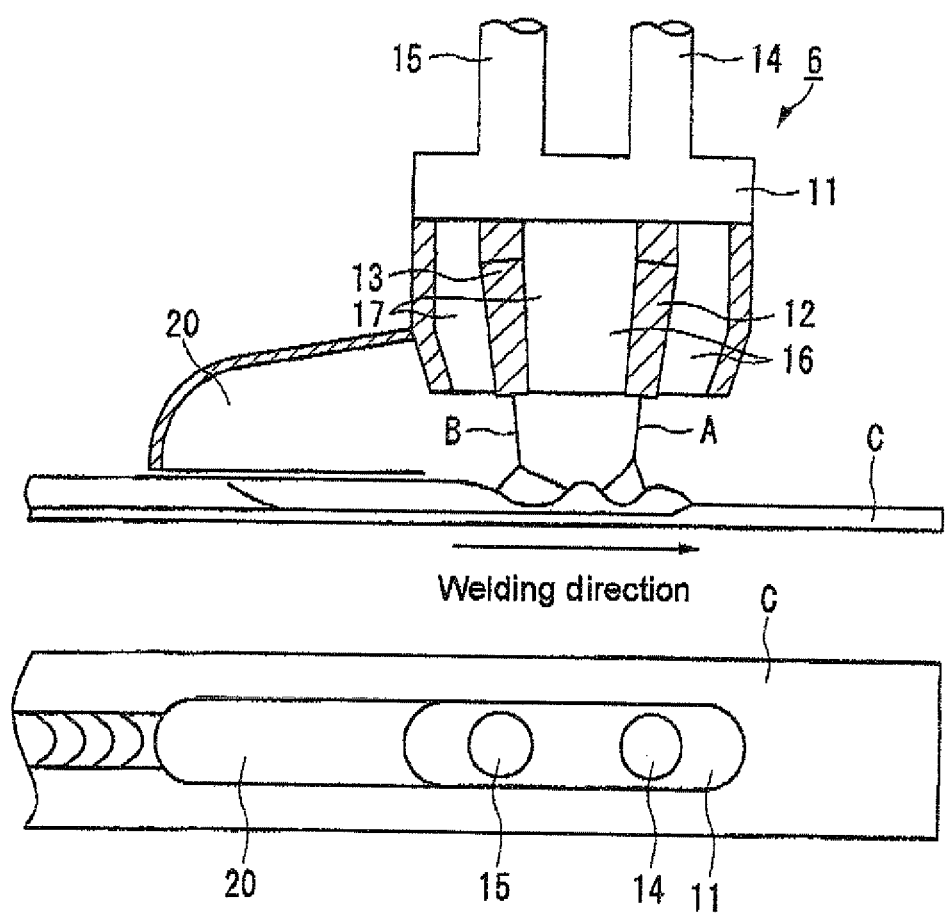
FIG. 4 is a schematic view showing a third example of the welding torch.
Figure 5:
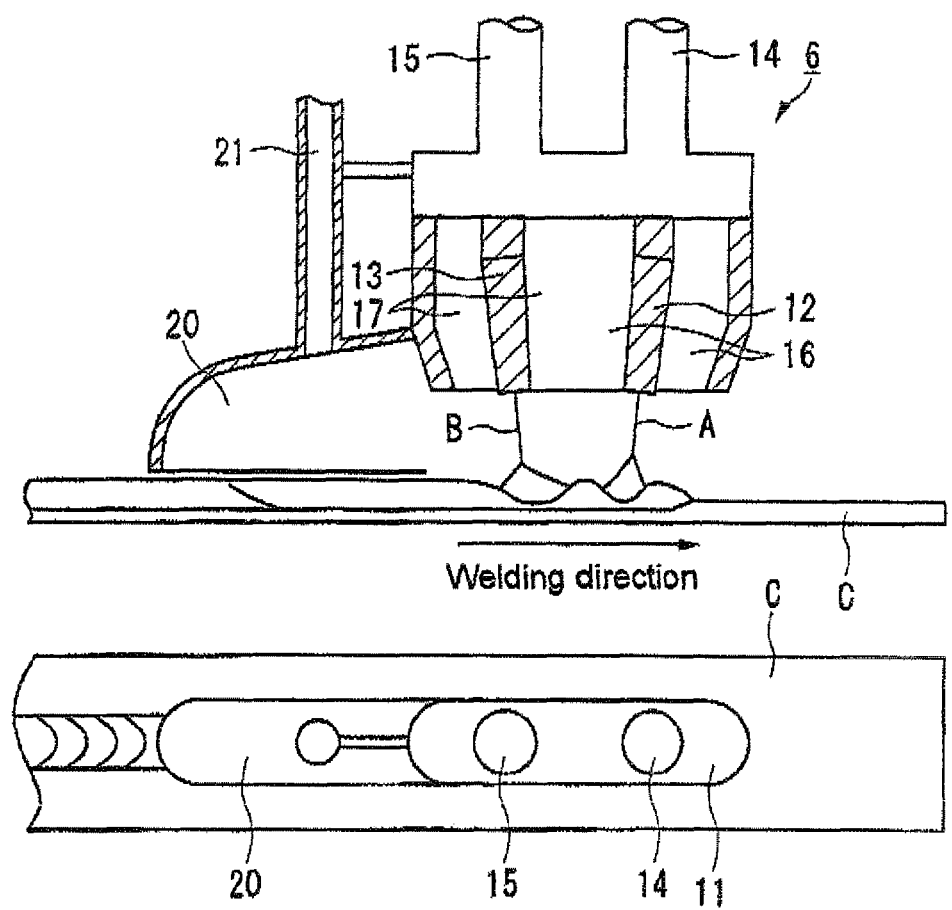
FIG. 5 is a schematic view showing a fourth example of the welding torch.

FIG. 4 shows the third welding torch used in the welding method according to the present invention. FIG. 5 also shows the fourth welding torch used in the welding method according to the present invention. The third welding torch 6 has a protection cover 20 in a dome shape at the backward side of the nozzle 11 in the welding direction. The fourth welding torch 6 has her a shielding gas nozzle 21 at the protection cover 20.

The length of the molten pool obtained by tandem GMA welding is longer, compared with the molten pool obtained by GMA welding using one welding wire. Therefore, it is impossible for a conventional welding torch to sufficiently shield the molten pool which is backward in the welding direction.

In the third welding torch 67 the protection cover 20 is fixed at the backward side of the welding torch 6, and the shielding gas is supplied so as to shield the entire molten pool from the atmosphere. Thereby, it is possible to prevent the weld metal from oxidation, and nitriding. In addition, it is also possible to prevent the generation of weld defects such as blow holes.

When the shield performance is further improved, the shielding gas nozzle 21 is fixed to the upper portion of the protection cover 20 and the shielding gas is directly supplied to the inside of the protection cover 20, as shown in the fourth example.

As the shielding gas supplied to the shielding gas nozzle 21, argon, a two-component mixed gas containing argon and carbon dioxide, a two-component mixed gas containing argon and oxygen, or a three-component mixed gas containing argon, carbon dioxide, and oxygen, can be used.

Moreover, the welding torch according to the present invention is not limited to the first to fourth embodiments shown in FIGS. 2 to 5. For example, the welding torch according to the present invention may be a tandem GMA welding torch having nozzles each of which has an independent electrode.

EXAMPLE

In order to confirm the effects obtained by the present invention, bead-on-plate welding was carried out using the tandem GMA welding apparatus and the welding torch shown in FIGS. 1 and 2, and then the amount of the spatter generated and penetration conditions were evaluated.

As the shielding gas for the leading and trailing electrodes, a two-component mixed gas containing argon and carbon dioxide was used. Moreover, the composition of the shielding gas was changed. All of the spatter generated in welding was corrected using a spatter collection box, and the amount of the spatter was measured. The flow rate of the shielding gas for the leading electrode and the trailing electrode was adjusted to 25 L/min individually.

A solid wire (YGW11) having a diameter of 1.2 mm was used as the welding wire. The welding current for mild steel in both electrodes was fixed at 325A. The arc voltage was adjusted to a boundary voltage, at which the short circuiting transfer changes to the spray transfer, in each shielding gas. As a base material, SS400 (plate thickness: 12 mm) which is a rolled steel for general structure and specified in JIS G 3101, was used.

The welding torch is positioned vertically. The distance between the leading electrode and the trailing electrode was 19 mm. The inclined angle of each electrode relative to the vertical direction was 4 degrees, as shown in FIG. 2. Therefore, the angle between the electrodes was 8 degrees. The contact tip-to-work distance was 25 mm.

The concentration of carbon dioxide in the shielding gas for the leading and trailing electrodes was varied at 0, 2, 5, 10, 20, 30, and 40% by volume, and the amount of the spatter generated was measured. The results are shown in Table 1.

Moreover, in Table 1, the number in the upper line of each column is a sample number. The sample Nos. 1 to 10, and 27 to 30 belong to the present invention. In contrast the sample Nos. 11 to 25, 26, and 31 are out of the scope of present invention.

The lower alphabet in each column shows a classification depending on the carbon dioxide concentration in the shielding gas for the leading electrode. A, B, D, E, and F show that the carbon dioxide concentration in the shielding gas for the leading electrode is 5, 10, 20, 30, and 40% by volume respectively.

The lower number in each column shows the evaluation of the spatter, "3" is standard. The larger the number is, the greater the effects of decreasing the amount of the spatter generated are obtained.

The symbol "X" in the lower line in each column denotes that the measurement was impossible due to unstable arc, and the symbol denotes that an example is out of the scope of the evaluation.

TABLE 1

| | | Concentration of carbon dioxide in the shielding gas for the leading electrode (% by volume) | | | | | |
|---|---|---|---|---|---|---|---|
| | | 2 | 5 | 10 | 20 | 30 | 40 |
| Concentration of carbon dioxide in the shielding gas for the trailing electrode (% by volume) | 0 | 26 x | 27 A-4 | 28 B-4 | 29 D-5 | 30 E-6 | 31 F-3 |
| | 2 | 11 x | 1 A-4 | 2 B-4 | 3 D-5 | 4 E-5 | 21 F-3 |
| | 5 | — | 12 A-3 | 5 B-4 | 6 D-4 | 7 E-5 | 20 F-3 |
| | 10 | — | 22 A-2 | 13 B-3 | 8 D-4 | 9 E-4 | 19 F-3 |
| | 20 | — | — | 23 B-2 | 14 D-3 | 10 E-4 | 18 F-3 |
| | 30 | — | — | — | 24 D-2 | 15 E-3 | 17 F-3 |
| | 40 | — | — | — | — | 25 E-2 | 16 F-3 |

Next the weld penetration was evaluated by adjusting the concentration of carbon dioxide in the shielding gas for the leading and trailing electrodes to 0, 2, 5, 10, 20, 30, and 40% by volume. The results are shown in Table 2.

There are various depth standards in weld penetration depending on the material to be welded. The required depth and criteria in weld penetration are different depending on the material to be welded. In Table 2, the results of sample No, 13 are the standard in evaluation.

Similar to Table 1, the number in the upper line of each column is a sample number, The sample Nos. 1 to 10, and 27 to 30 belong to the present invention. In contrast, the samples Nos. 11 to 25, 26, and 31 are out of the scope of the present invention.

The lower line shows the results of weld penetration conditions. The standards for evaluation of the weld penetration conditions are as follows.
  Excellent, deep weld penetration
  Good: slightly deep weld penetration
  Normal: normal weld penetration
  Poor: slightly shallow weld penetration
  Very poor: shallow penetration Moreover, similar to Table 1, the symbol "-" denotes that an example is out of the scope of the evaluation. The standard sample may not always be sample 13, and may be sample No. 12 or 14 depending on the material to be welded.

One effect obtained by the present invention is that the weld penetration depth is not decreased. Specifically, when samples Nos. 11, 12, 13, 14, 15, and 16, which were obtained by using the shielding gasses for the leading and trailing electrodes having the identical composition, are standards, and the concentration of carbon dioxide in the shielding gas for the trailing electrode is changed, there are no samples where the weld penetration depth is decreased.

Moreover, "Poor" in the samples Nos. 1, 12, 22, and 27 does not denote insufficient weld penetration depth, but denotes that the weld penetration depth in samples Nos. 1, and 27 is no shallower compared with the sample No. 12,

TABLE 2

| | | Concentration of carbon dioxide in the shielding gas for the leading electrode (% by volume) | | | | | |
|---|---|---|---|---|---|---|---|
| | | 2 | 5 | 10 | 20 | 30 | 40 |
| Concentration of carbon dioxide in the shielding gas for the trailing electrode (% by volume) | 0 | 26 Very Poor | 27 Poor | 28 Normal | 29 Good | 30 Excellent | 31 Excellent |
| | 2 | 11 Very Poor | 1 Poor | 2 Normal | 3 Good | 4 Excellent | 21 Excellent |
| | 5 | — | 12 Poor | 5 Normal | 6 Good | 7 Excellent | 20 Excellent |
| | 10 | — | 22 Poor | 13 Normal | 8 Good | 9 Excellent | 19 Excellent |
| | 20 | — | — | 23 Normal | 14 Good | 10 Excellent | 18 Excellent |
| | 30 | — | — | — | 24 Good | 15 Excellent | 17 Excellent |
| | 40 | — | — | — | — | 25 Excellent | 16 Excellent |

As shown in Table 1, it is clear that the amount of the spatter generated can be decreased by making the concentration of carbon dioxide in the shielding gas for the trailing electrode less than that of carbon dioxide in the shielding gas for the leading electrode. Specifically, when the concentration of carbon dioxide in the shielding gas for the leading electrode is 20% by volume (the samples Nos. 24, 14, 8, 6, 3, and 29), and the concentration of carbon dioxide in the shielding gas for the trailing electrode is 10, 5, 2, and 0% by volume, the amount of the spatter generated was small. The same results could be obtained when the concentration of carbon dioxide in the shielding gas for the leading electrode is 5, 10, and 30% by volume.

In addition, as shown in Table 2, it is clear that when the concentration of carbon dioxide in the shielding gas for the trailing electrode is smaller than that of carbon dioxide in the shielding gas for the leading electrode, the weld penetration depth was almost not decreased.

In addition, as shown in Table 2, the weld penetration depth in the sample Nos. 11 and 26 was shallow and insufficient. In these samples, the arc was unstable, and the appearance of the beads was inferior. It is believed that this was caused by a lower concentration of carbon dioxide in the shielding gas for the leading electrode. Therefore, the concentration of carbon dioxide in the shielding gas for leading electrode is preferably 5% by volume or more.

Furthermore, the following analysis results were obtained by using these data.

When the concentration of carbon dioxide in the shielding gas for the leading electrode is 30% by volume, the weld penetration depth in both the sample Nos. 15 and 10 was large, as shown in Table 2. However, the amount of the spatter generated in sample No. 10 was smaller than that of the spatter generated in sample No. 15, as shown in Table 1. Therefore, we judged that sample No. 10 is suitable and sample No. 15 is not suitable based on these results.

Similar to samples No. 15 and 10 when the concentration of carbonic acid gas in the shielding gas for the leading electrode is 5, 10, and 20% by volume, samples Nos. 12, 13, and 14 are considered to be unsuitable, from the viewpoint of the weld penetration depth and the effects of decreasing the amount of spatter.

Nos. 16 to 21, and 31 axe considered to be unsuitable because the amount of spatter generated could almost not be decreased by decreasing the concentration of carbon dioxide in the shielding gas for the trailing electrode.

When the concentration of carbon dioxide in the shielding gas for the leading electrode is 40% by volume or more, the reaction force exerting on the droplet at the edge of the welding wire was excessive to gravitational force applied to the droplet and the droplet hardly dropped from the edge of the welding wire. Thereby, the droplet became enlarged at the edge of the welding wile, and contacted with the molten pool. As a result, the amount of spat was increased. It is believed that this was caused because the concentration of carbon dioxide in the shielding gas for the leading electrode was large, aid the droplet could not be spray-transferred by adjusting the voltage or current, and the droplet transfer contained short circuiting transfer.

From these experimental results, it is clear that the concentration of carbon dioxide in the shielding gas for the leading electrode needs to preferably be 5% by volume or more and less than 40% by volume, and more preferably 10% by volume or more and 30% by volume or less.

Moreover, the required weld penetration conditions are different in the thickness of the plate to be welded.

It is considered that the welding, in which the concentration of carbon dioxide in the shielding gas for the leading electrode is from about 20% by volume to about 30% by volume, is preferable for a case in which a thick plate is welded, and it is desired that an amount of the spatter generated is low and the weld penetration depth is deep.

It is considered that the welding, in which the concentration of carbon dioxide in the shielding gas for the leading electrode is from about 10% by volume to about 20% by volume, is preferable for a case in which a thin plate is welded, deep weld penetration is not particularly required, and the effect of decreasing the amount of the spatter generated is considered as being important.

It is also considered that the welding in which the concentration of carbon dioxide in the shielding gas for the leading electrode is from about 5% by volume to about 10% by volume, is preferable for a case in which an extremely thin plate is welded, burn-tough easily occurs, and the effect of decreasing the amount of the spatter generated is considered as being important.

INDUSTRIAL APPLICABILITY

According to the method for tandem GMA welding of the present invention, it is possible to decrease the amount of the spatter generated during welding without a decrease of the weld penetration depth. Thereby, it is possible to decrease the load for removing the spatter, and a decrease in cost of welding can be realized. In additions the droplet transfer is stable, and it is also possible to decrease the amount of spatter generated without a decrease in the weld penetration depth.

Furthermore, according to the torch and the apparatus for tandem GMA welding of the present invention, shielding gases having a different composition can be supplied to the leading and trailing electrodes without mixing. Therefore, it is possible to exert the effects of the shielding gas at a maximum.

The invention claimed is:

1. A method for tandem gas metal arc welding using a consumable leading electrode and a trailing electrode, the method comprising:
    (a) sending a first welding current to a wire supplying device of the consumable leading electrode;
    (b) sending a second welding current to a wire supplying device of the trailing electrode;
    (c) applying the first and second welding currents to respective welding wires of the leading and trailing electrodes;
    (d) supplying a shielding gas for the consumable leading electrode that is a two-component mixed gas containing argon and carbon dioxide, or a three-component mixed gas containing argon, carbon dioxide, and oxygen; and
    (e) supplying a shielding gas for the trailing electrode that is argon, a two-component mixed gas containing argon and carbon dioxide, a two-component mixed gas containing argon and oxygen, or a three-component mixed gas containing argon, carbon dioxide, and oxygen,
    wherein steps (d) and (e) are practiced such that the concentration of carbon dioxide in the shielding gas for the trailing electrode is lower than the concentration of carbon dioxide in the shielding gas for the leading electrode.

2. A method for tandem gas metal arc welding according to claim 1, wherein step (d) is practiced such that the concentration of carbon dioxide in the shielding gas for the leading electrode is 5-40% by volume, and the concentration of oxygen in the shielding gas for the leading electrode is up to 10% by volume.

3. A method for tandem gas metal arc welding according to claim 2, wherein steps (d) and (e) are practiced such that the difference between the concentration of carbon dioxide in the shielding gas for the leading electrode and the concentration of carbon dioxide in the shielding gas for the trailing electrode is at least 3% by volume, and the concentration of oxygen in the shielding gas for the trailing electrode is up to 10% by volume.

4. A method for tandem gas metal arc welding according to claim 1, further comprising switching the gases such that the shielding gas for the leading electrode is supplied to an electrode to be the leading electrode, and the shielding gas for the trailing electrode is supplied to an electrode to be the trailing electrode in accordance with the reverse welding direction.

5. A torch for tandem gas metal arc welding,
    wherein the torch has a consumable leading electrode and a trailing electrode inside a nozzle, and a partition for preventing mixing of a shielding gas for the consumable leading electrode and a shielding gas for the trailing electrode,
    the shielding gas for the consumable leading electrode is a two-component mixed gas containing argon and carbon dioxide, or a three-component mixed gas containing argon, carbon dioxide, and oxygen,
    the shielding gas for the trailing electrode is argon, a two-component mixed gas containing argon and carbon dioxide, a two-component mixed gas containing argon and oxygen, or a three-component mixed gas containing argon, carbon dioxide, and oxygen, and a concentration of carbon dioxide in the shielding gas for the trailing electrode is lower than a concentration of carbon dioxide in the shielding for the leading electrode.

6. A torch for tandem gas metal arc welding, comprising, a protection cover for shielding a molten pool which is fixed backward in a welding direction, the torch further has a consumable leading electrode and a trailing electrode inside a nozzle, a shielding gas for the consumable leading electrode is a two-component mixed gas containing argon and carbon dioxide, or a three-component mixed gas containing argon, carbon dioxide, and oxygen, a shielding gas for the trailing electrode is argon, a two-component mixed gas containing argon and carbon dioxide, a two-component mixed gas containing argon and oxygen, or a three-component mixed gas containing argon, carbon dioxide, and oxygen, and a concentration of carbon dioxide in the shielding gas for the trailing electrode is lower than a concentration of carbon dioxide in the shielding gas for the leading electrode.

7. A torch for tandem gas metal arc welding according to claim 6, wherein the protection cover has a shielding gas nozzle.

8. An apparatus for tandem gas metal arc welding comprising:

a welding torch including a consumable leading electrode and a consumable trailing electrode;

a shielding gas supplying source for supplying a shielding gas to each, of said leading and trailing electrodes, the shielding gas for the leading electrode is a two-component mixed gas containing argon and carbon dioxide, or a three-component mixed gas containing argon, carbon dioxide, and oxygen, and a shielding gas for the trailing electrode is argon, a two-component mixed gas containing argon and carbon dioxide, a two-component mixed gas containing argon and oxygen, or a three-component mixed gas containing argon, carbon dioxide, and oxygen, wherein a concentration of carbon dioxide in the shielding gas for the trailing electrode is lower than a concentration of carbon dioxide in the shielding gas for the leading electrode; and a switching device for switching between the shielding gas supplied to the leading electrode and the shielding gas supplied to the trailing electrode.

* * * * *